Feb. 5, 1924.

A. CURIONI 1,482,630

MACHINE FOR MAKING POWDER PUFFS

Filed April 20, 1921

INVENTOR
Aldo Curioni
BY
ATTORNEYS

Feb. 5, 1924.

A. CURIONI 1,482,630

MACHINE FOR MAKING POWDER PUFFS

Filed April 20, 1921    7 Sheets-Sheet 2

Inventor
Aldo Curioni
By his Attorneys

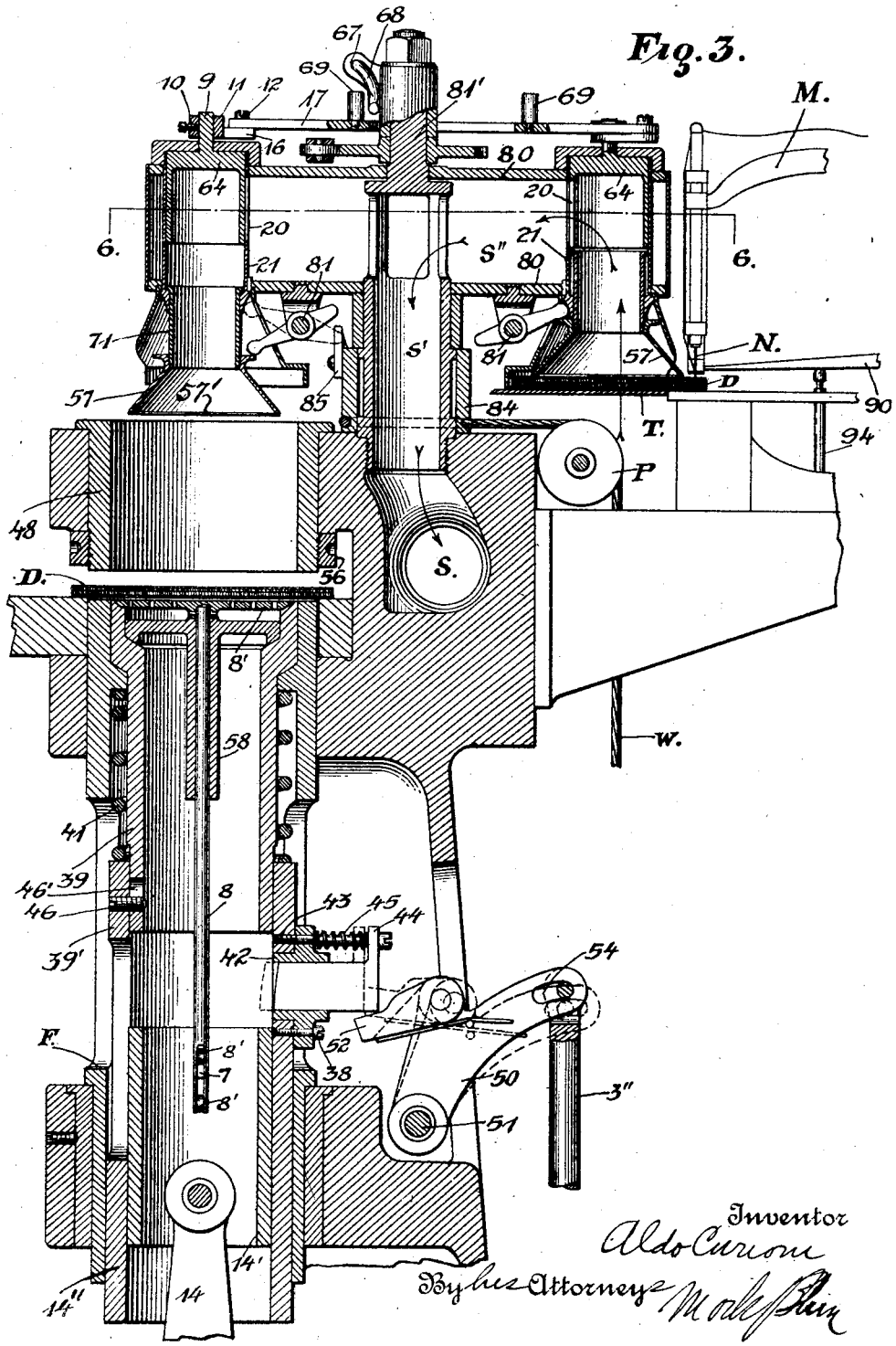

Feb. 5, 1924.
A. CURIONI
1,482,630
MACHINE FOR MAKING POWDER PUFFS
Filed April 20, 1921
7 Sheets-Sheet 4
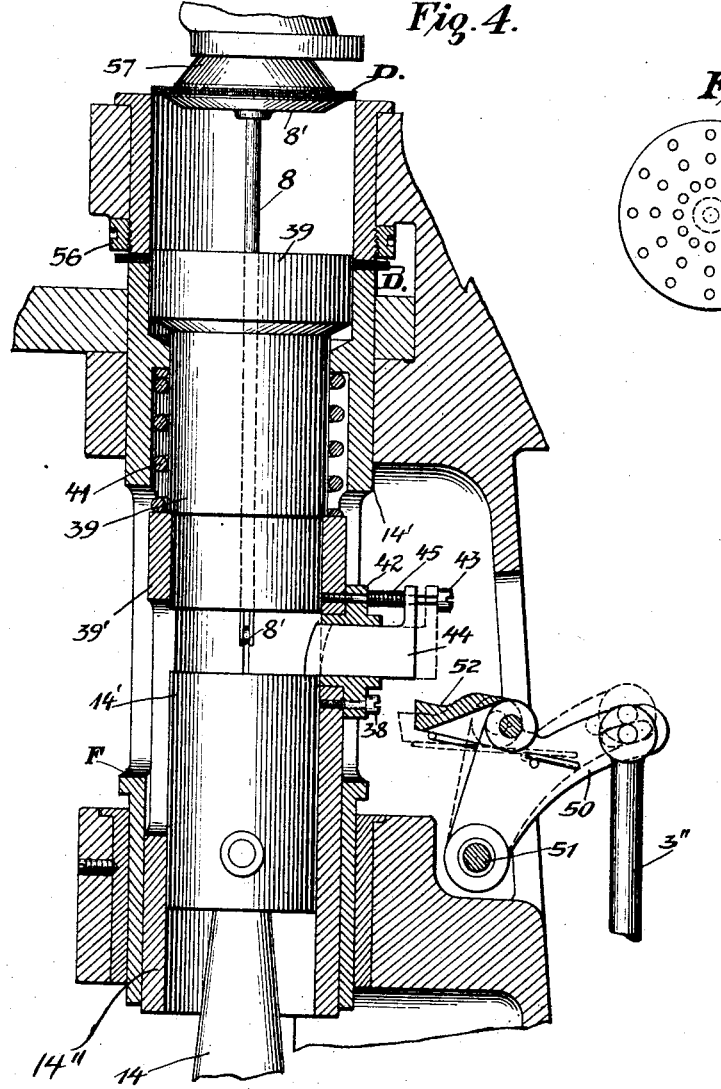
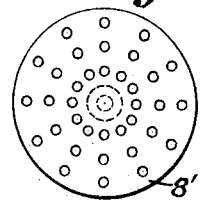
Inventor
Aldo Curioni
By his Attorneys

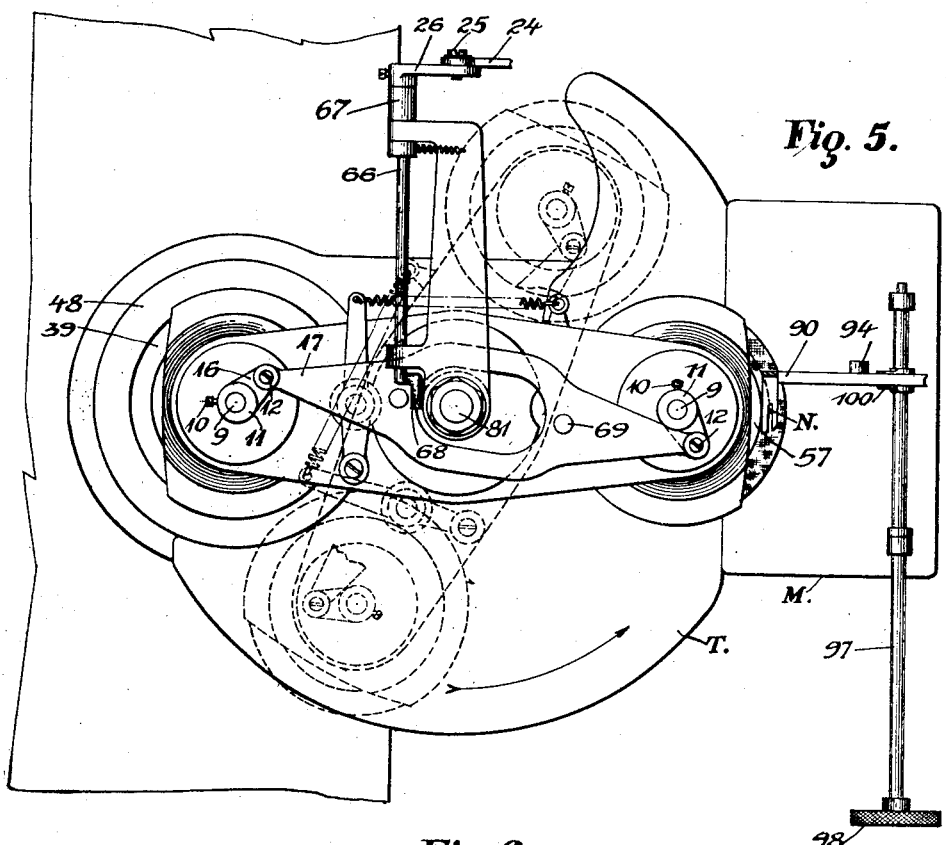
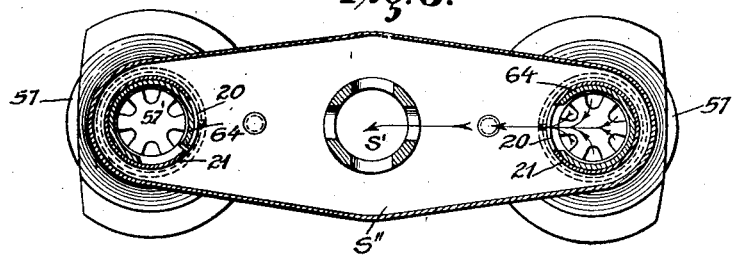
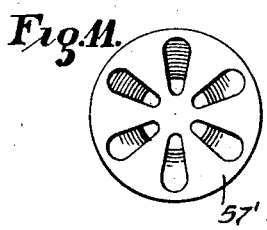

Feb. 5, 1924.
A. CURIONI
1,482,630
MACHINE FOR MAKING POWDER PUFFS
Filed April 20, 1921      7 Sheets-Sheet 6
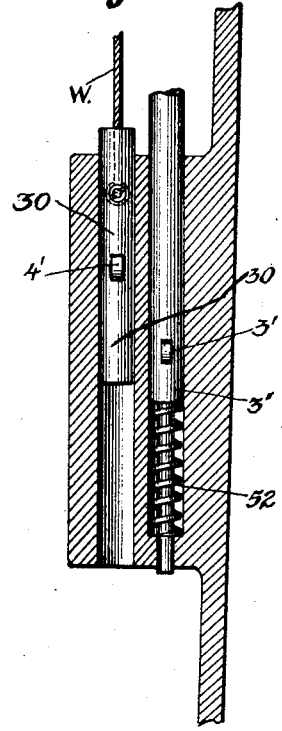
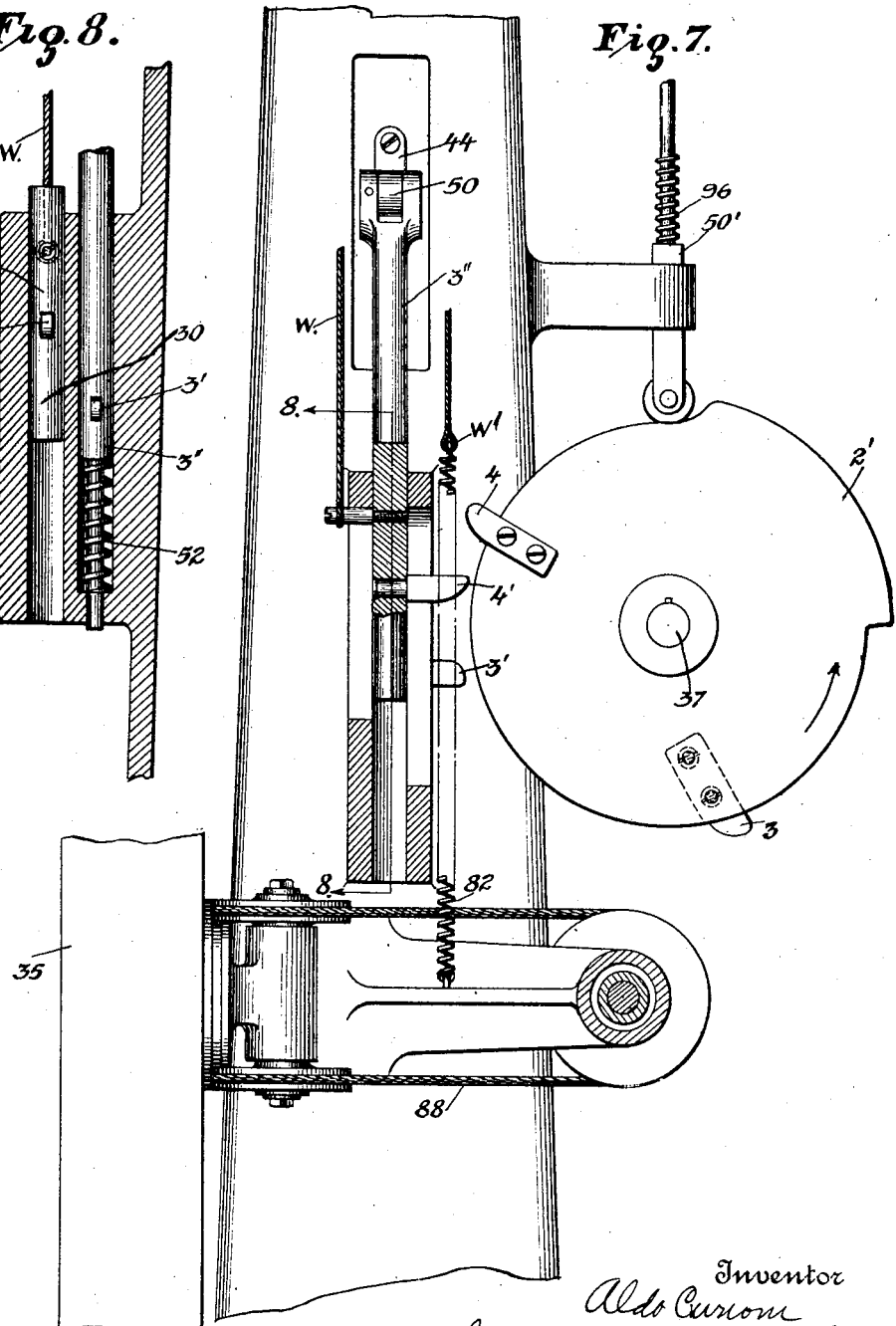
Inventor
Aldo Curioni
By his Attorneys

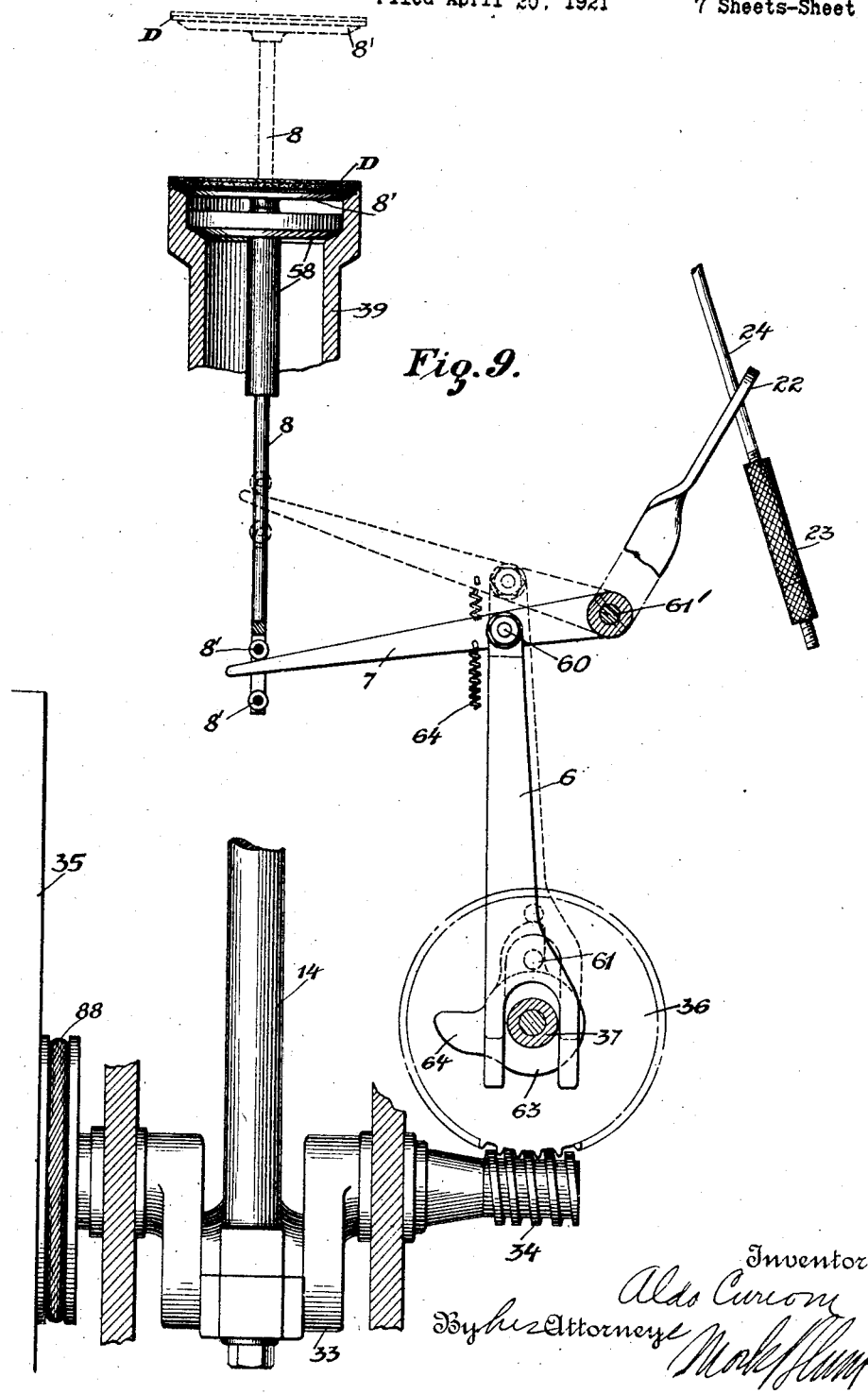

Patented Feb. 5, 1924.

1,482,630

UNITED STATES PATENT OFFICE.

ALDO CURIONI, OF NEW YORK, N. Y., ASSIGNOR TO MAURICE LEVY, OF NEW ROCHELLE, NEW YORK.

MACHINE FOR MAKING POWDER PUFFS.

Application filed April 20, 1921. Serial No. 463,018.

*To all whom it may concern:*

Be it known that I, ALDO CURIONI, a subject of the King of Italy, residing at 255 Edgecombe Avenue, in the city of New York, in the county of New York and State of New York, have invented certain new and useful Improvements in Machines for Making Powder Puffs, of which the following is a specification.

My invention relates to a new and improved machine for making powder puffs.

Powder puffs consist of two discs of material such as lambs' wool or the like, prepared with a backing of fabric so that one side of the disc has a pile so as to receive the powder, while the other side of the disc, namely, the side which has the backing, is substantially a continuous piece of fabric. Up to the present time, all such powder puffs have been made by hand and it has been customary for the operator to place two of these discs with their fibrous or pile surfaces adjacent each other, sew these discs around their edges so as to make a little bag having a gap or unsewed part about an inch or two in length, and then turn the little bag so formed inside out so that the fibrous or pile surfaces were formed on the outside of the article.

The sewing of the bag was then completed by hand, a ribbon being added and the puff was then completed.

No machine has been hitherto designed to perform these operations automatically and as a result, the expense and time involved in the hand-work have been very substantial.

One of the objects of my invention is to provide a machine for completing the greater part of the before mentioned operations, that is, to sew the two discs together while their fibrous surfaces are adjacent each other.

Another object of my invention is to automatically cause the said discs to be punched out and fed in proper position to the sewing mechanism.

Another object of my invention is to provide a machine to which the said discs are fed and which holds the said discs until the operations are completed.

Other objects of my invention will be set forth in the following description and drawings which illustrate a preferred embodiment thereof.

Figure 3 is a section along the line 3—3 of Figure 1.

Figure 4 shows a detail of Figure 3 with the parts in a different position.

Figure 5 is a top view along the line 5—5 of Figure 1.

Figure 6 is a section along the line 6—6 of Figure 1.

Figure 7 is a detail rear view of Figure 1, partially in section.

Figure 8 is a section along the line 8—8 of Figure 7.

Figure 9 is a detail rear view of Figure 1 and is partially in section.

Figure 10 is a plan view of the top of the plunger.

Figure 11 is a plan view of the bottom of the suction funnel.

Figure 1:
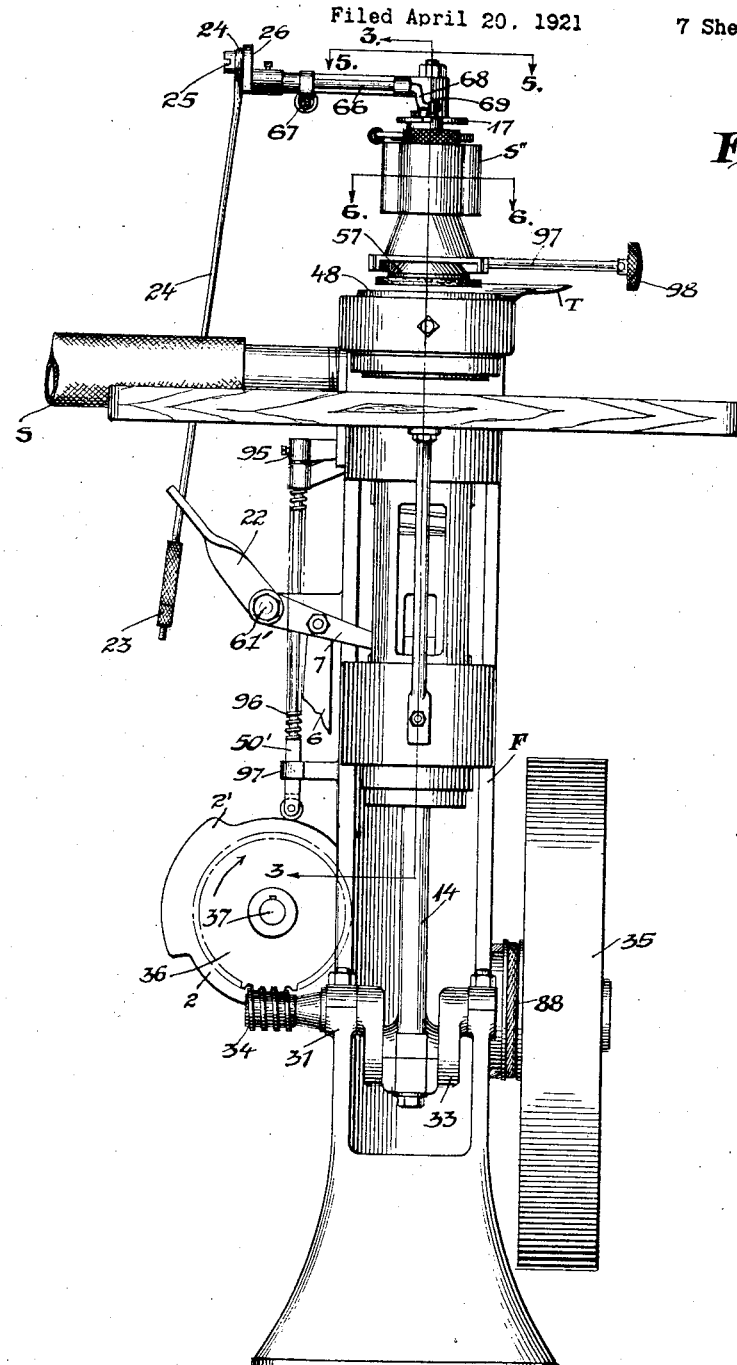
Figure 1 is a front elevation.
Figure 2:
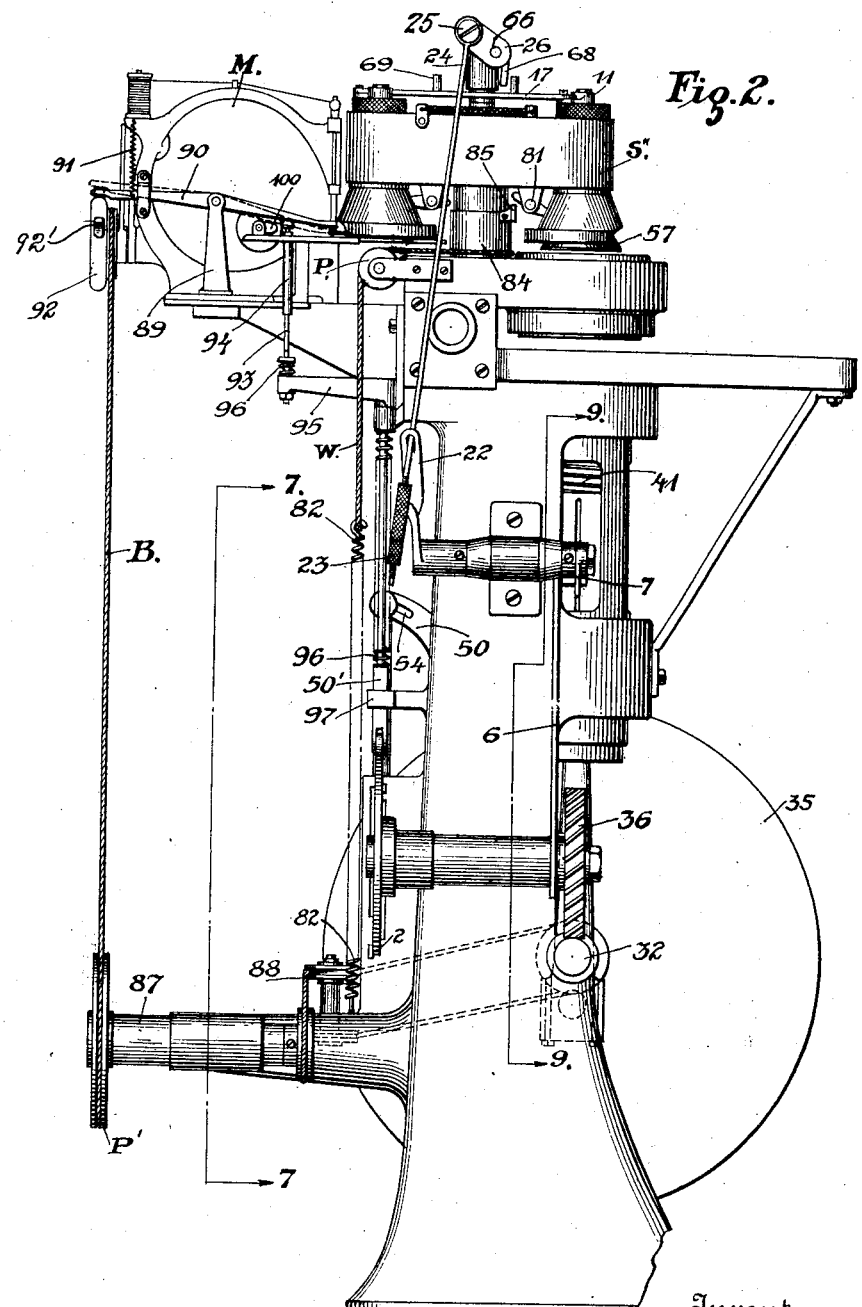
Figure 2 is a side view.

As shown more particularly in Figures 1 and 2, the machine is provided with a base having bearings 31 in which a shaft 32 having the eccentric or crank portion 33 can be revolved. The shaft 32 is provided at one end with a worm 34 and at the other end with a pulley 35 around which a band or belt can be led, so as to turn the main shaft 32 from any suitable source of power.

The eccentric portion 33 is connected in the well known manner to a pitman 14 and the upper end of this pitman 14, as can be clearly seen in Figure 3, is connected adjacent the lower end of a cylinder 14' to said cylinder, in the well known manner, so that as can be seen more particularly in Figures 3 and 4, the revolution of the shaft 32 causes the cylinder 14' to be quite rapidly reciprocated.

The cylinder 14' which may be called the punch actuating cylinder is guided in the cylinder 14" which slides up and down in the frame F of the machine. The cylinder 14" is connected by means of a bolt 38 to a slide 42 whose upper end bears against a ring 39' having secured thereto a bolt 46 which projects into a slot 46' of a punch cylinder 39.

The upper end of the punch cylinder 39 is sharpened so as to act as the male member of the punch and this punch cylinder 39 also slides in and is guided by the hollow frame F of the machine.

The actuating cylinder 14' can normally reciprocate without actuating the punch cylinder 39 but it is clear from Figures 3 and 4 that the punch cylinder 39 can be actuated by moving the thrust member 44 from the position shown in full lines in Figure 3 to the position shown in dotted lines in this figure.

The slide 42 is connected to the ring 39' by means of the bolt 43 having thereon the compression spring 45 which normally urges the thrust member 44 against the head of the bolt 43 as shown in full lines in Figure 3 and as shown in dotted lines in Figure 4.

If the thrust member 44 is in the position shown in dotted lines in Figure 3, then the movement of the cylinder 14' is transmitted to the punch cylinder 39 so that it is moved from the position shown in Figure 3 which is its lowest position, to the position shown in Figure 4 in which by cooperation with the female punch member 48, it has severed two discs of fabric D which have previously been suitably placed in position by the operator. These discs D which have their fibrous surfaces adjacent each other are shown in Figure 4 as having been raised above the top of the punch cylinder 39 by other mechanism to be later described.

The guide cylinder 14'' slides in the frame F of the machine as clearly shown in Figure 3.

The thrust member 44 is actuated by the lever 50 pivoted at 51 and having the cam nose 52 which is adapted to force the thrust member 44 to the left, as seen in Figure 3, when the lever 50 is revolved in the clockwise direction.

The lever 50 is slotted at 54 and a rod or lever 3'' has a pin which fits into the slot.

As can be more clearly seen in Figures 7 and 8, the lever 3'' rests upon the compression spring 52 which normally forces it upwardly so as to cause the lever 50 to release the thrust member 44.

The rod 3'' has a projection 3' which as can be seen in Figure 7, is periodically forced downwardly by the projection 3 upon the cam wheel 2. The cam wheel 2, as seen more clearly in Figures 1, 2 and 7, is mounted upon the transverse shaft 37, and this shaft 37 is provided with a worm wheel 36 which is operated by the worm 34 upon the shaft 32. The cam wheel 2 also has the cam projection 2', the function of which will be later described.

The revolution of the cam wheel 2 is very much slower than the revolution of the shaft 32, so that the number of reciprocations of the punch cylinder 39 is only a fraction of the number of reciprocations of the punch 14' whereby the operator has plenty of time to put the discs D in proper position.

It will also be observed that the cylinder 14' does not directly actuate the punch cylinder 39, but only does so by means of the bolt 46 of ring 39' which is normally forced down by the compression spring 41.

Hence the first shock or impact of the cylinder 14' is taken up by the spring 41 so that the movement of the punch cylinder 39 is not too abrupt.

By means of the mechanism before described, two discs D of the proper size can be severed and they can also be carried into female die member 48 which is suitably threaded into a threaded socket 56 on the frame of the machine as clearly seen in Figures 3 and 4.

It is now necessary to lift the discs D from the top of the cylinder 39 and force them against the suction funnel 57 as clearly seen in Figure 4.

The mechanism for doing this is as follows:—

The punch cylinder 39 is provided with an interior guide portion 58 which consists of an upright part and horizontal parts as clearly shown in Figure 3. A rod 8 provided with a perforated disc lifter 8' slides up and down in the guide 58. The part 8' is clearly shown in Figure 10.

The rod 8 is slotted at the lower end thereof and the actuator 7 which may be called the disc rod lifter, moves in this slot so as to periodically raise the rod 8.

As can be seen more clearly in Figure 9, the actuator 7 operates between two rollers 8', the two positions thereof and the two positions of the rod 8 being shown in full and in dotted lines in Figure 9.

The actuator 7 has a lifter rod 6 pivoted thereto at 60, the said actuator being pivoted at 61' to the frame of the machine.

The rod 6 has a fork provided with a pin 61 at the lower part thereof and this fork embraces the shaft 37 of the cam wheel 2.

The cam wheel 2 is provided with a rear cam portion 63 having a nose 64, and this cam portion operates upon the pin 61 so as to raise the rod 6.

The lever 7 has a tension spring 64 secured thereto and to any suitable part of the frame of the machine so as to normally bring it into the lower position. The cam 63 is designed so that after the punch 69 has operated to sever the discs D, the rod 8 is now lifted so as to force the discs D against the bottom of the suction funnel 57.

In order to hold the two discs D against the mouth 57' of the funnel, the shape of which is clearly shown in Figure 11, suction is employed. As clearly shown in Figure 1, the suction pipe S is attached to any suitable means such as a fan or the like, for continually producing a suction therethrough. The end of the suction pipe S is clearly shown in Figure 3 and the air is sucked through the vertical pipe S' which is in communication by means of the air chest S" with both funnels 57 by means of the intermediate cylindrical portions 21 having the ports 20 in the sides thereof as clearly shown in Figures 3 and 6.

The cylinders 21 have cylindrical valve portions 64 which fit quite snugly therein so as to open or close the ports 20. For example, in the views shown in Figures 3 and 6, the left ports 20 are closed and the right ports 20 are open so that the path of the air currents is indicated by the arrows shown in Figure 3.

The valve portions 64 have cylindrical projections 9 connected to the revoluble heads 11 by means of the set screws 10 and these heads 11 may be revolved to and fro by means of the yoke 17 which is pivoted at 12 to the levers 16 so that, as clearly shown in Figure 5, when one valve portion 64 is revolved to open its port, the other one is revolved so as to close its port.

The yoke 17 is reciprocated by the following mechanism:—

As can be clearly seen in Figures 1 and 9, a bell crank lever 22 is connected at the pivot point 61' to the lever 7 so as to be actuated by the movement thereof. Of course, the members 22 and 7 could be integral with each other so as to move in unison.

Hence, when the lever 7 is moved upwardly, the lever 22 revolves counter-clockwise from the position shown in Figure 1 so that the end thereof strikes against the knurled end 23 of the rod 24 which, as clearly shown in Figures 1, 2 and 5, is pivoted at 25 to the arm 26 of the shaft 66 mounted in the bearings 67.

As can be clearly seen in Figure 5, one end of the shaft 66 has a laterally bent portion 68 which is adapted to contact with the adjacent pin 69 of the slidably mounted yoke 17 so as to move the yoke 17 at the proper time to the left of the position it occupies in Figure 5 and when this is done, the left funnel 57 receives the suction, and the right funnel 57 no longer has any air currents forced therethrough.

The discs D are forced against the left funnel 57 so as to raise the same upon the guide 71 just after the discs at the right hand side of Figure 3 have been sewed by the sewing machine M.

Hence as the rod 8 is raised, the left hand funnel 57 has the two discs D forced against it. The left hand funnel 57 is raised to the position shown at the right hand side of Figure 3, thereby revolving the adjacent lever 80 pivoted at 81 and the yoke 17 is then moved so as to cause the suction to act upon the left funnel 57 and maintain the discs D in position when the rod 8 is lowered.

The next step in the operation of the machine is to rotate the funnels 57 through an arc of 180° so as to present the discs to the sewing machine M.

As can be clearly seen in Figure 3, the funnels 57 slide up and down on guides 71 which are extensions of the cylinders 21 and the cylinders 21 are mounted on a lever or yoke 80 which is pivotally mounted on the central post 81'.

The cam wheel 2 has a lateral projection 4, which is adapted to periodically depress the projection 4' of the rod 30, as can be clearly seen in Figures 7 and 8.

The rod 30 has a flexible wire or cable W connected thereto as can be clearly seen in the drawing, and this cable W runs around pulleys and parts to be later described, and terminates in an eye W' connected to a tension spring 82 which is fastened to the frame of the machine as clearly shown in Figure 7. Hence when the rod 30 is depressed, the eye W' is raised and when the cam projection 4 releases the corresponding projection 4', the tension spring operates to move the parts back to the normal position shown in Figure 7.

As clearly shown in Figure 2 and 3, cable W passes around pulleys P which are located one behind the other and also around a groove in the upright ring 84 which can be revolved about the pipe S'.

Hence when the cable W, as shown in Figure 3, is pulled downwardly by the action of the parts before described, the ring 84 is revolved counter-clockwise, if we assume that it is being observed from a point above the top of the machine.

As can be seen in Figure 3, the ring 84 has a flange 85 suitably secured to the left hand side thereof, and this engages the lever 80 at the left hand side of Figure 3 when this has been revolved by the upward movement of the funnel 57, the said upward movement having been produced by the parts heretofore described.

Hence the pull of the cable or band W will cause the two funnels shown in Figure 3 to exchange positions, the funnel 57 at the left hand side being maintained in the upper position as it is rotated by means of the suction of the air passing through the pipe S' because as already explained, this suction will act upon the left funnel 57 before it is rotated. At the same time the suction is being released from the right funnel 57, the discs D which have been sewed together by the parts to be later described, are left upon the table T adjacent the sewing machine M and these discs will be pushed off the table T to be collected in a suitable box or the like by the movement of the funnel 57 as it proceeds from the left side to the right side of the machine.

The two discs D which have been placed on the table T must now be sewed together. For this purpose I have found that it is necessary to use a chain stitch or its equivalent, that is, a stitch which does not cause the thread to overlap the edges of the discs D in order to secure satisfactory results and I generally refer to this type of stitch as a "chain" stitch for the purposes of the description and claims. It must be remembered that after the stitching has been completed so that the two discs D have been partially sewed together, that the little bag thus formed must be turned inside out and that the stitch must then be concealed in order not to irritate the skin of the user. It is desirable that the chain stitch sewing machine employed should be designed so that its needle should have a large movement and that it should be possible to adjust the amplitude of movement of this needle and to also adjust the height of the presser foot above the table of the sewing machines.

The discs D resting upon the table T are now acted upon by the ordinary feed dog, or other feeding means of the sewing machine, so as to be revolved about their central point and it will be noted that the funnels 57 can be freely revolved about their guides for this purpose.

As the discs D are revolved they are sewed together in the ordinary manner and this sewing is to be interrupted as soon as a predetermined portion of the circumferences of the two discs has been sewed together. It will be noted that the line of stitch shall be somewhat within the circumferences of the discs D.

As can be seen more particularly in Figure 2, the sewing machine M is driven by a belt B actuated by a pulley P' on a shaft 87 and this is actuated by means of a belt 88 from a pulley on the shaft 32, as can be more clearly seen in Figure 1.

Of course, any other suitable means of actuating the pulley P' could be substituted.

The base of the sewing machine M has an upright 89 to which a rod 90 is pivoted and the rod 90 is normally held in the position shown in Figure 2 by the tension spring 91.

The wheel 92 of the sewing machine has a projection 92' which rotates therewith, and if the lever 90 shown in Figure 2 is revolved in the counter-clockwise direction, the end thereof is interposed in the path of movement of this projection so that the wheel 92 is prevented from further revolving and the sewing machine is stopped, while the belt B slips so as to permit the other parts to continue moving.

The lever 90 is revolved at the proper time by the upward movement of a rod 93 mounted in a guide 94. The rod 93 is moved upwardly by means of the extension 95 of the rod 50', it being noted that these parts are connected by means of springs 96 which take up any sudden jar. The rod 50' slides in the guide 97 and it is actuated at suitable intervals as can be clearly seen in Figure 1 by the cam 2' on the cam wheel 2.

The length of stitch of the sewing machine M can be adjusted as this is part of the standard equipment of sewing machines, so that the amount of the circumferences of the two discs D that is sewed together can be varied without changing the timing of the cam 2'.

The action of the cam 2' is such that a suitable part of the powder puff is sewed together and the action of the sewing machine is automatically interrupted while the needle thereof is out of contact with the discs D before the funnels 57 are rotated as before mentioned.

As the sewed discs D are moved away from the sewing machine, the thread is pulled out somewhat before the section is released and it is then broken, leaving the sewing machine in position for operating upon the next pair of discs.

It may be noted that the rod 24 may be pulled down by hand so as to shift the yoke 17 and that the sewing machine may be thrown out of operation at any time by revolving the shaft 97 by means of the handwheel 98 as this upwardly revolves the lever 100 which accomplishes the same result as the upward movement of the rod 93.

The operation of my machine is as follows.

Before the machine is started, the yoke 17 is moved by hand or the like, so that the suction effect is exerted upon the right hand end and upon the funnel 57 located there. Before the suction is produced, the operator may place two pieces of fabric in the proper position adjacent the mouth of the right hand funnel 57, so that when the suction is produced, these discs will cling there tightly. Two superposed sheets of fabric can then be placed so as to be acted upon in the proper manner by the punching mechanism at the left hand side of the machine, and the handle 98 can now be turned so as to allow the sewing machine to be set into operation. The projection 3 of the cam wheel 2 first strikes the projection 3' of the rod 3" so as to depress this, and revolve the lever 50 shown in Fig. 3 anti-clockwise, and thus cause a connection to be produced between the pitman 14 and the punch cylinder 39. The punch cylinder 39 is then moved upwardly into the position shown in Fig. 4 so as to sever two discs from the fabric. The several discs of fabric are then engaged by the perforated member 8', which is operated by the mechanism shown in Fig.

9 so as to push the severed discs against the bottom 57' of the left hand funnel 57.

As clearly shown in Fig. 9, the member 24 is actuated before the lifter 8' reaches its highest position so that the yoke 17 is partially shifted before the lever 7 has reached its highest position, and hence when the discs of fabric come into contact with the bottom 57' of the funnel 57, they are held there by the suction. Before the shifting of the yoke 17 has been completed by the revolution of the shaft 66, the sewing mechanism is stopped by the action of cam 2' upon the rod 50' and then the member 4 shown in Fig. 7 comes into contact with the member 4' so as to revolve the member 80. When the member 80 has been revolved for a short distance, so as to move the sewed discs of fabric D away from the sewing mechanism, the yoke 17 is moved sufficiently to transfer all the suction effect so that the discs of fabric D which have been sewed together, drop from the mouth of the funnel 57, the thread with which they have been sewed together having been severed from the thread in the machine by the pulling action before described.

I have described a preferred embodiment of my invention but it is clear that numerous changes and omissions can be made without departing from its spirit.

I claim:—

1. In a machine for sewing powder puffs, the combination with a sewing mechanism adapted to produce a chain stitch, of revoluble means adapted to hold two superposed discs of fabric adjacent the presser foot and feeding mechanism of the said sewing machine whereby the actuation of said sewing machine causes said discs to be revolved together with said revoluble means and to be stitched together along a circular line, the said revoluble means being movable to carry the discs towards and away from said needle after the stitching has been completed, to draw out the thread.

2. A device according to claim 1 embodying means adapted to automatically stop the movement of the said sewing machine before the said discs have been completely sewed togther and while the needle of the said sewing mechine is out of contact with the said discs.

3. A mechanism comprising means for punching out two discs of fabric closely adjacent one another, means for holding and transporting said two discs in their associated relation to a sewing machine so as to cause the two discs to be sewed together, means for actuating said sewing machine after the discs are presented thereto, and means for releasing the said discs from the said transporting means after the sewing operation thereon has been completed, and after the thread of the sewing machine has been severed.

4. In a machine for partially sewing powder puffs embodying sewing mechanism, a punch cylinder, means for reciprocating the said punch cylinder, a ring-like member located above the punch cylinder and cooperating therewith so that the action of the parts before mentioned severs two discs of fabric from a piece placed between them, means for lifting said discs through said ring-like member, and holding means located above the ring-like member and adapted to hold the said discs when the said discs are presented to it.

5. In a machine for partially sewing powder puffs embodying sewing mechanism, means for punching out two discs of fabric closely adjacent each other, suction means adapted to hold the said discs of fabric when they are presented to it, means for moving the said severed punched-out discs of fabric against the said suction means, and means for causing a suction through the said suction means so as to hold the same when the said discs of fabric come into contact therewith.

6. In a machine for partially sewing powder puffs embodying sewing mechanism, means for punching out two discs of fabric closely adjacent to each other, a cylinder having a funnel revolubly mounted upon the lower part thereof, the said funnel having a perforated bottom, means for pushing the punched discs of fabric against the bottom of the said funnel so as to raise the same, and means for then producing a suction through the said cylinder whereby the said discs are caused to cling to the bottom of the said funnel until the said suction is released.

7. In a machine for partially sewing powder puffs embodying sewing mechanism, a plurality of cylinders mounted rotatably so that they move about an axis located outside of the said cylinders, means for intermittently producing suction through the said cylinders, funnels revolubly and slidably mounted upon the bottoms of the said cylinder, means for punching out two discs of fabric closely adjacent each other, means for pushing the said two discs of fabric against one of said funnels so as to raise the same, means for then placing the said cylinder connected with said last-mentioned funnel in communication with said suction means so as to hold the said discs of fabric against the bottom of the said funnel and to raise the said funnel to its upper position, and means operated by the raising of the said funnel which cause it to be placed in operative relation with mechanism for moving said funnel away from the point at which it received the said discs of fabric.

8. In a machine for partially sewing powder puffs embodying sewing mechanism, cylinders provided with ports and mounted upon a revoluble member, means located adjacent said cylinders for opening or closing said ports, means for creating a continual suction through said ports when they are opened, disc holding members slidably and revolubly mounted upon the lower parts of said cylinders, means for revolving said member upon which the said cylinders are mounted, and means for intermittently opening and closing said ports, so that a suction is caused through one of said cylinders to hold discs of fabric upon the said disc holding members at one point in the movement of the said cylinders, and the said cylinders are released from the said suction at another point in their movement.

9. In a machine for partially sewing powder puffs embodying sewing mechanism, a revolubly mounted arm having cylinders provided with ports secured thereto, valve-like means adapted to cooperate with the said ports for opening and closing them, a reciprocable member connected to said valve means and adapted to open and close them by the reciprocation thereof, so that when the port of one of said cylinders is opened, the port of the other of said cylinders is closed, disc holding members slidably and revolubly mounted upon the lower parts of said cylinders, means for feeding two discs of fabrics against the bottoms of said disc holding members at one point in their movement, said reciprocable means being operated so as to produce a suction through said disc holding members immediately after the said discs have been fed thereto, and means for then revolving the said arm so as to present the said discs of fabric to a sewing machine.

10. In a machine for partially sewing powder puffs embodying sewing mechanism, a hollow punch cylinder, a ring-like member adapted to cooperate therewith so as to punch out discs of fabric from pieces of fabric inserted between them, a revoluble arm having cylinders provided with ports secured thereto, means for intermittently revolving said arm through an arc of 180°, so that each of said cylinders alternately occupies a position directly above said ring-like member, a sewing machine located adjacent the position which each of said cylinders occupies when it has been moved away from said ring-like member by the revolution of the said arm to an arc of 180°, means located within the said punch cylinder for moving the said discs of fabric through the said ring-like member against a disc holding member revolubly mounted upon the said cylinders, means for producing suction through said cylinders and disc holding members immediately after said discs have been pushed against the said disc holding members, and means for releasing the said suction after the said discs have been presented to the said sewing machine and the sewing operation thereon has been completed, and means for intermittently operating said sewing mechanism.

11. In a machine for partially sewing powder puffs embodying sewing mechanism, a revolubly mounted arm, means for actuating said arm located adjacent thereto but normally disconnected therefrom, so that the said means can operate without revolving the said arm, cylinders provided with ports mounted upon the said arm, valve means for opening and closing the said ports, means for maintaining a suction through the said cylinders when the said ports are opened, disc holding members revolubly and slidably mounted upon the said cylinders, means for pushing discs of fabric against the said disc holding members so as to move them along their cylinders, mechanism for opening the said valve means immediately after the said discs have been pushed against the said disc holding members, so that the suction operates to move the said disc holding members along the said cylinders, and connecting means between the said arm and the operating means therefor which are put into operative position by the movement of the said disc holders, whereby the said operating means actuate the said arm immediately after the said disc holding means receive the discs of fabric.

12. In a machine for partially sewing powder puffs, a revolubly mounted arm having a plurality of cylinders provided with ports secured thereto, revoluble valve-like members mounted within said cylinders and adapted to open and close the said ports, a yoke connected to the said valve-like members, and adapted to simultaneously actuate them when the said yoke is reciprocated, so that one of said cylinders will have its port open while the other thereof will have its port closed, a suction chest surrounding the said ports, means for continuously maintaining a suction through the said suction chest, means for intermittently operating the said yoke, means for intermittently reciprocating the said yoke at one of the positions thereof, revoluble levers secured to the said arm and adjacent the said cylinders, disc holding members slidably and revolubly mounted upon the said cylinders and adapted to revolve the said levers upon being moved along the said cylinders, means for presenting two discs of fabric to the said holders at one position of the said arm, means for immediately operating the said yoke thereafter so as to open the port of the cylinder to whose disc holding member the said discs of fabric have been presented whereby the said disc holding member holds said discs and will be slid along the said cylinder to operate the said pivoted lever adjacent thereto, and means adapted to engage with the said pivoted lever after the revolution thereof, so as to revolve the said arm and present the said discs to a sewing machine while the suction is maintained upon the said discs.

In testimony whereof I hereunto affix my signature.

ALDO CURIONI.